United States Patent [19]

Khopov

[11] Patent Number: 5,418,612
[45] Date of Patent: May 23, 1995

[54] METHOD OF AND APPARATUS FOR DETERMINING SURFACE CONTOUR OF DIFFUSELY REFLECTING OBJECTS

[75] Inventor: Vladimir V. Khopov, Leningrad, Russian Federation

[73] Assignee: Renishaw, plc, Gloucestershire, England

[21] Appl. No.: 307,436

[22] Filed: Sep. 19, 1994

Related U.S. Application Data

[63] Continuation of Ser. No. 835,903, filed as PCT/SU89/00184, Jun. 30, 1989, abandoned.

[51] Int. Cl.[6] .............................................. G01B 9/02
[52] U.S. Cl. .................................. 356/360; 356/357
[58] Field of Search ................. 356/359, 360, 357, 345

[56] References Cited

U.S. PATENT DOCUMENTS

| | | |
|---|---|---|
| 4,225,240 | 9/1980 | Balasubramanian . |
| 4,647,205 | 3/1987 | Kalliomaki . |
| 4,792,230 | 12/1988 | Naganuma et al. ................. 356/346 |
| 4,869,593 | 9/1989 | Biegen ................................ 356/359 |
| 5,042,949 | 8/1991 | Greenberg et al. ................. 356/359 |
| 5,157,458 | 10/1992 | Wagner et al. ....................... 356/346 |
| 5,159,408 | 10/1992 | Waldenmaier et al. ............. 356/360 |

*Primary Examiner*—Samuel A. Turner
*Attorney, Agent, or Firm*—Oliff & Berridge

[57] ABSTRACT

A method of determining surface contour of diffusely reflecting objects is realized by interferometric comparison of beams reflected from a reference mirror and from an object (11), by changing the optical path length of the object beam, by focusing the object beam onto a plane corresponding to the zero path length difference between the beams being compared interferometrically, and by measuring said variation of the optical path length from an initial value up to a moment when appears an interference pattern displaying maximum contrast. An apparatus intended to realize the method comprises an objective and, mounted in succession, a coherent radiation source, an interferometer including a beam-splitter, a reference mirror mounted in front of one face of the surface of the beam-splitter on the beam path perpendicular to it, and an optical path modulator mounted in front of the other face of the surface of beam-splitter with a possibility to produce oscillating movements along the beam path and fitted with a device measuring the displacements of said modulator. Besides that, the apparatus contains a photodetector, a device for sensing contrast of the interference bands, and a device detecting position of the modulator. The modulator posesses a corner reflector whose axis of symmetry is parallel to the beam path and exterior to the plane of the beam splitter. The objective is made with a possibility to integrate optically the coherent radiation source with a plane corresponding to the zero path length difference of the interferometer.

10 Claims, 3 Drawing Sheets

METHOD OF AND APPARATUS FOR DETERMINING SURFACE CONTOUR OF DIFFUSELY REFLECTING OBJECTS

This is a continuation of application Ser. No. 07/835,903 filed as PCT/SU89/00184, Jun. 30, 1989, now abandoned.

FIELD OF THE INVENTION

The present invention relates to instrumentation engineering and may be used to determine surface contour of diffusely reflecting objects by using the principle of low-sensitive speckle interferometry and more particularly, by using a method based on the evaluation of contrast in an interference pattern resulting from interference between the speckle-structure of light reflected from a diffuse object and a reference beam.

DESCRIPTION OF THE PRIOR ART

The time needed for determining surface contours of reflecting objects depends to a high degree on the quantity of light falling upon the aperture diaphragm of a photodetector. This dependence is due to the fact that, other conditions being the same, larger exposure gives a higher signal-to-noise ratio at the output of said photodetector, thus allowing an increase of the motion speed of an optical path modulator of an object or of a reference beam and thereby closing up the cycle of measurements more quickly in spite of the signal level decrease caused by the limited response speed of the photodetector.

In order to analyze the contrast in the interference pattern, formed by a reference beam and a beam reflected from a diffuse object and having a speckle structure, the size of the aperture diaphragm in the photodetector receiving said interference pattern must be equal to the size of an average element in said structure because the phase of speckles is a random value (J. Vest "Holographic Interferometry", 1979, John Wiley and Son's (New York).

Known is a method of determining surface contour of diffusely reflecting objects by splitting coherent light in two beams, one of which is directed towards the object and the other of which is used as a reference beam when the object hologram is being taken, and by determining, in the hologram plane forming the field of interference of reference and object beams and modulated by the speckle structure, the points with maximum contrast between interference bands. At these points the difference between optical path lengths of the beams equals zero, and, therefore, the optical path length of the reference beam, which is known, characterizes the object dimensions. (N. Abramson "The Making and Evaluation of Holograms", 1981, ed. Acad. Press, (London), pp. 315-319).

Known is an apparatus for determining surface contour of diffusely reflecting objects based on a holographic interferometer and comprising a coherent light source (a laser), an interferometer which includes an amplitude beam-splitter made as a mirror, a second mirror intended to form a reference beam, and a photodetector in the form of a hologram which is located in the field of interference of the reference and object beams. (N. Abramson "The Making and Evaluation of Holograms", 1981, ed.Acad. Press, (London), pp.315-319).

The hologram is registered only in those parts of a photoplate where the difference between optical path lengths of the interfering beams is smaller than the coherence length of laser emission. These places on a photoplate where the contrast of the interference bands is the strongest, as well as the object surface regions corresponding to said hologram, may be determined by viewing the object image recreated by lightening the hologram with the reference beam. Since the configuration of the reference beam is known, the surface shape of the object is derived from the condition of equality of the optical path lengths of the beams up to the parts of photoplate with the maximum contrast of the interference pattern.

The described method and apparatus for determining surface contour of diffusely reflecting objects, due to the use of a hologram playing the role of a high-resolution detector, allow, during the same period of time, analyzing the form of an object at any possible sizes of elements in the speckle structure of the light reflected from said object. However, the use of a hologram as means for registering the result of interference of the reference beam and the beam reflected from the object, does not allow to realize the described design in the real time scale, and therefore the realization of said method takes a lot of time.

Known is a method of determining surface contour of diffusely reflecting objects by splitting coherent light coming from a radiation source in two beams, one of which is directed to a reference mirror thus forming a reference beam, and the other is directed to an object, forming an object beam; by superimposing and interferometrically comparing the beams reflected from the object and from the reference mirror; by changing the reference beam optical path length; by focusing the object beam onto a plane situated in the region where are modified the positions of a plane corresponding to zero difference of optical path lengths of he reference and the object beams; and, by measuring variations of the reference beam optical path length from its initial value up to the moment when the maximum contrast occurs in the interference pattern, which contrast characterizes the parameter to be evaluated (U.S. Pat. No. A, 4,647,205).

Known is an apparatus intended to realize the described method and comprising the following elements mounted in consecutive order—a coherent light source (laser), a lens, a Michelson type interferometer including a beam splitter, a reference mirror which is turned towards one face of the beam splitter surface and mounted perpendicular to the beam path onto the optical path modulator (U.S. Pat. No. A, 4,647,205). The optical path modulator is mounted with a possibility of producing oscillating movements along the beam path within a specified range and possesses a device intended to measure displacements or, said modulator. The range of displacements of the optical path modulator is selected upon the condition of correspondence between the positions of said modulator and the region of possible positions of the object surface. At the same time, the modulator must modify the optical path by more than two coherence lengths of the light source. This condition is due to the necessity to analyze function of contrast between the bands; which is varying inside said range of the difference between optical path lengths of interfering beams. Moreover, the apparatus contains a photodetector, mounted at the output of the interferometer, a device evaluating interference bands contrast, the input of said device being connected to the output of the photodetector, and a device determining the positions of the optical path modulator, which device is connected to the device for measuring displacements of the modulator and to the output of the device for evaluating the contrast between interference bands.

The optical path modulator is a membrane fitted with an electromagnetic drive in the shape of a coil which is connected to a saw-tooth current generator. A reference mirror is attached to the membrane. The device measuring displacements of the modulator comprises a system which measures the initial position of the optical path modulator and relative displacements of the latter, which system includes an ammeter for measuring sawtooth current applied to the membrane and a calibration chart of correspondence between the current applied to the membrane and the reference mirror position. The modulator initial position is that of the membrane with the reference mirror attached to it, in case the current is equal to zero.

Different to the previous solution is the method proposed in U.S. Pat. No. A, 4,647,205, which is realized in the real time scale and hence significantly shortens the time of its realization, though said time still remains relatively long. The reason, as it has been mentioned above, is that during the analysis of the contrast of an interference pattern formed by a reference beam and a beam reflected from a diffuse object and characterized by a speckle structure, implies that the size of the photodetector aperture diaphragm must be equal to the size of an average element in the speckle structure. Therewith it is known, that the speckle size depends on the accuracy of focusing the beam onto the object surface. In the method and apparatus according to U.S. Pat. No. A, 4,647,205, the object beam is focused in order to increase the spatial resolution of the device. The beam is focused onto a plane located in an invariable position in the zone of variation of the position of the plane corresponding to the zero difference between the path lengths of the reference and object beams. It means that, if the object surface does not lie in said plane, this leads to a defocusing of the object beam accompanied by a decrease of the speckle structure dimensions. In order to realize a measurement carried out at the moment of coincidence of the plane corresponding to the zero path length difference between the reference and object beams, and of the object surface, and characterized by an interference pattern with a maximum contrast, it is necessary to reduce the photodetector aperture diaphragm, so as to match said diaphragm to the size of one average element in the speckle structure over the whole range of the object positions and this, in turn, decreases the exposure of the photodetector and deteriorates the signal-to-noise ratio. It is possible to increase signal level in order to provide the desired accuracy of measurements by decreasing the speed of movement of the optical path modulator, that is by increasing the time of measurements.

Moreover, the use of the calibrating chart of correspondence, between the current applied to the membrane and the reference mirror position for the measurement of initial position of the optical path modulator and of its relative displacement, requires a rather frequent calibration of the device requiring variations of the optical path modulator parameters due to, for example, variations of environment temperature or to ageing of the modulator membrane.

SUMMARY OF THE INVENTION

The principal object of the present invention is to provide a method of determining surface contour of diffusely reflecting objects, in which the object beam is focused onto a plane situated so, and to provide an apparatus for determining surface contour of diffusely reflecting objects, in which an optical path modulator is built so, and an objective is made and located so as to provide an increase of the average size of elements of the speckle structure of coherent light scattered by the diffuse object, at a moment when the object surface coincides with a plane which corresponds to the zero path length difference between reference and object beams in an interferometer, that is at the moment when an interference pattern of the maximum contrast occurs, and thus to increase the quantity of light falling onto a photodetector, thereby allowing a reduction of the time required for the determining the surface contour of diffusely reflecting objects.

With this principal object in view, there is a method of determining the surface contour of diffusely reflecting objects by splitting the radiation from a coherent light source in two beams, one of said beams being directed to a reference mirror to form a reference beam, and the other being directed to the object to be measured to form an object beam; by bringing to a coincidence and by interferometrical comparison of beams reflected from the reference mirror and from the object; by varying the optical path of the beam; by focusing the object beam; and by measuring said variation of the optical path of the beam from its initial length up to the moment when the maximum contrast of interference pattern occurs, indicating the parameter to be found out. According to the invention, the known per se variation of the object beam optical path length is realized, whereas the object beam is focused onto a plane corresponding to the zero path length difference between the object and reference beams being compared.

With the principal object in view, there is an apparatus for determining surface contour of diffusely reflecting objects comprising an objective and, located in consecutive order, a coherent radiation source, a double-beam interferometer including a beam splitter, a reference mirror turned towards a first face of the beam splitter surface, and mounted perpendicular to the beam path, an optical path modulator mounted with a possibility of producing oscillating movements along the beam path within a specified range and fitted with a device intended to measure displacements of said modulator and having a system for measuring initial position of the optical path modulator, a photodetector located at the output of the interferometer, a device for evaluating the contrast between interference bands with its input connected to the output of the photodetector, and a device detecting position of the optical path modulator, said device being connected to the device which measures displacements of the optical path modulator and to the output of the device sensing the contrast between interference bands. According to the invention, the optical path modulator is mounted in front of a second face of the beam splitter surface and is fitted with a corner reflector whose reflecting surfaces are turned to said second face of the beam splitter surface. The axis of symmetry of the corner reflector is parallel to the beam path and exterior to the beam splitter surface. The objective is made with a possibility to integrate optically the coherent radiation source and a plane corresponding to the zero path length difference of the interferometer.

The focusing of the object beam onto a plane corresponding to the zero path length difference between interfering beams provides, when the object beam optical path is changing, a simultaneous movement of the object beam focus and of said plane, and, accordingly, a coincidence between the object beam focus and the surface of the object to be evaluated during the measurements which are carried out at the moment of coincidence between said plane and the plane of the zero difference of the optical path lengths between interference beams, and are characterized by an interference pattern presenting maximum contrast. With the described focusing of the object beam the average size of elements in the speckle structure of coherent light dispersed by a diffuse object grows up to its maximum value at the moment of measurement, that is when maximum contrast occurs in the interference pattern, thus allowing to build a photodetector with an aperture diaphragm characterized by the dimensions greater than those of an aperture diaphragm of the photodetector proposed in U.S. Pat. No. A, 4,647,205 and so, it becomes possible to increase the quantity of the light falling on the photodetector and to reduce the time needed for determining surface contour of diffusely reflecting objects.

The use, on the optical path modulator, of a corner reflector mounted on said modulator as described above, as well as the objective realized with a possibility to optically integrate the radiation source with the plane corresponding to the zero path length difference between the interfering beams, provide simultaneously a displacement of the plane corresponding to the zero path length difference between the object and the reference beams; and a refocusing of the object beam in such a manner that its focus always coincides with the location of said plane and, accordingly, with the surface of the object under study, at the moment when maximum contrast of the interference patter is registered.

Another embodiment of the apparatus may be provided in which it is useful to realize the objective out of two components, to situate the first component after the source of coherent radiation and away frown it by a distance equal to the focal length of the first component being situated, and the second component between the beam splitter and the optical path modulator, at a point distant from the former by the difference of the distance between the beam splitter and the reference mirror, and of the focal length of the second component.

In this embodiment of the apparatus, the optical integration of the source with the plane corresponding to the zero path length difference of the interferometer is provided by the lens second component placed between the beam-splitter and the optical path modulator. The lens first component serves to collimate the beam emitted by the radiation source, promoting in this way, as a rule, a decrease of dimensions of the apparatus.

In another possible embodiment of the apparatus it is advisable to place the lens between the coherent radiation source and the beam splitter. Here the optical integration, of the coherent radiation source with the plane corresponding to the zero path length difference of the interferometer, is provided by the lens which is mounted after the coherent radiation source, the focal length of said lens and its location relative to said radiation source being Chosen by the known methods of selection of the lens.

Both proposed embodiments of the apparatus for determining surface contour of diffusely reflecting objects, from the point of view of the problem to be solved, namely of the aim to increase during the measurements, that is at the moment when the interference pattern of maximum contrast occurs, the average size of elements in the speckle structure of coherent light scattered by the diffuse object, are two equivalent solutions.

If the apparatus for determining surface contour of diffusely reflecting objects is made according to the embodiment in which the lens contains two components, the dimensions of the apparatus, especially when the object is at a considerable distance, are as a rule smaller than in the second embodiment. On the other hand, the apparatus made according to the second embodiment, where the lens mounted after the radiation source projects the radiation source onto the reference mirror surface and onto the plane corresponding to the zero path length difference of the interferometer, is more resistant to disalignment of the interferometer and its use is preferable in the processes characterized, for example, by vibrations or by elevated temperature.

If the apparatus is made according to the embodiment where the objective includes two components, it is advisable to shift the axis of symmetry of the second component of the lens relative to the axis of symmetry of the beam splitter and to supply the system intended to measure initial position of the optical path modulator with a photodetector, a device sensing contrast in interference bands, a first mirror located between the beam splitter and the reference mirror parallel to the latter, and a second mirror turned to reflecting surfaces of the corner reflector of the optical path modulator, placed perpendicular to the beam and shifted from the axis of symmetry of the corner reflector in the direction opposite to the beam splitter. Centers of the mirrors should be shifted relative to the axis of symmetry of the beam splitter in the direction opposite to the lens second component and should be placed away from the beam splitter by distances corresponding to equal optical paths. The photodetector should be situated after the exit window of the interferometer on the optical axis of the system measuring initial position of the optical path modulator, and the output of the photodetector should be connected to the input of the device sensing contrast in the interference bands of the system measuring initial position of the optical path modulator.

The initial position of the optical path modulator is that in which the mirrors of the system measuring initial position of the modulator are located away from the beam splitter by distances corresponding to equal optical path lengths. As the initial position of the modulator is measured using two mirrors rigidly fixed on the base of the apparatus, said measurement does not require calibration of the apparatus, and measurements of the initial position do not depend on possible variations of positions of the optical path modulator, such variations being due, for example, to instability of ambient temperature or to ageing of the membrane.

The displacement of the axis of symmetry of the lens second component relative to the axis of symmetry of the beam splitter provides formation of a parallel beam in the system measuring initial position of the optical path modulator and also provides the most effective use of the light emitted from the coherent radiation source. The apparatus in this embodiment of the invention, as it has been noted above, is preferable if the object is at a greet distance, for example, if the object has large dimensions or deep cavities, because the arrangement of mirrors in the system measuring initial position of the optical path modulator does not depend on the remoteness of the object.

If the apparatus is made in accordance With the second embodiment, it is useful for the system measuring initial position of the optical path modulator to include a photodetector, a device sensing contrast in interference bands, a first mirror located in front of the reflecting surfaces of the corner reflector at an angle to its axis of symmetry, and shifted from the axis of symmetry of said corner reflector in the direction opposite to the beam splitter, and a second mirror located on the beam path after the first mirror and perpendicular to the beam path. It is necessary that the second mirror and the reference mirror be located away from the beam splitter by distances corresponding to equal optical path lengths. The photodetector should be mounted after the exit window of the interferometer on the optical axis of the system measuring initial position of the optical path modulator, and be connected to the device sensing contrast in interference bands.

Here the initial position of the optical path modulator is that in which the second mirror of the system measuring initial position of the modulator and the reference mirror are located away from the beam-splitter by distances corresponding to equal optical path lengths. In this case the measurement of the modulator initial position, just as in the first embodiment of the apparatus, does not depend on the modulator parameters. However, as the position: of the second mirror of the system measuring initial position of the modulator depends on the reference mirror position, the latter being defined by the eventual distance of the object, for at large distances the dimensions of such an apparatus grow up. At the same time, owing to the fact that the reference mirror and said second mirror receive projections of a point source of light, a variation of position angles of these mirrors does not influence the operation of the apparatus, that is such apparatus is more resistant to disalignment of the interferometer than the apparatus of the first embodiment in which all the mirrors receive a parallel beam, and its use is preferable in the processes characterized by vibrations or by elevated temperatures.

The depicted advantages as well as the features of the present invention will be further on better understood, considering the following preferred embodiments of the invention with references to the accompanying drawings.

Since the proposed method is realized during the operation of the apparatus, the description of the method is given together with the description of operation of the apparatus.

BEST MODE TO CARRY OUT THE INVENTION

An apparatus for determining surface contour of diffusely reflecting objects comprises an objective 1 (FIG. 1) and, mounted in consecutive order, a coherent radiation source 2, a solid state laser for example, a double-beam interferometer 3, a Michelson type interferometer for example, which includes a beam splitter 4, a reference mirror 5 turned towards a first face 6 of the surface of the beam splitter 4 and located on the beam path perpendicular to it, and a beam path modulator 7 having a device 8 which measures displacement of the modulator 7. The optical path modulator 7 is mounted in front of a second face 9 of the beam splitter 4 surface and is fitted with a corner reflector 10, the reflecting surfaces of which are turned to said second face 9 of the surface of the beam splitter 4. The axis of symmetry of the corner reflector 10 is parallel to the beam path and exterior to the plane of the beam splitter 4. The modulator 7 is mounted with a possibility to execute oscillating movements along the beam path within a range corresponding to variation of the optical path length which exceeds two coherence lengths of the radiation source 2. The corner reflector 10 of the modulator 7 as well as the reference mirror, in a design according to U.S. Pat. No. A, 4,647,205, is mounted on a membrane (not shown) fitted with an electromagnetic drive (not shown) in the shape of a coil connected to a saw-tooth current generator(not shown). The beam splitter 4 with the reference mirror 5 form a reference beam and the beam splitter 4 with the corner reflector 10 of the optical path modulator 7 form an object beam.

Figure 1:
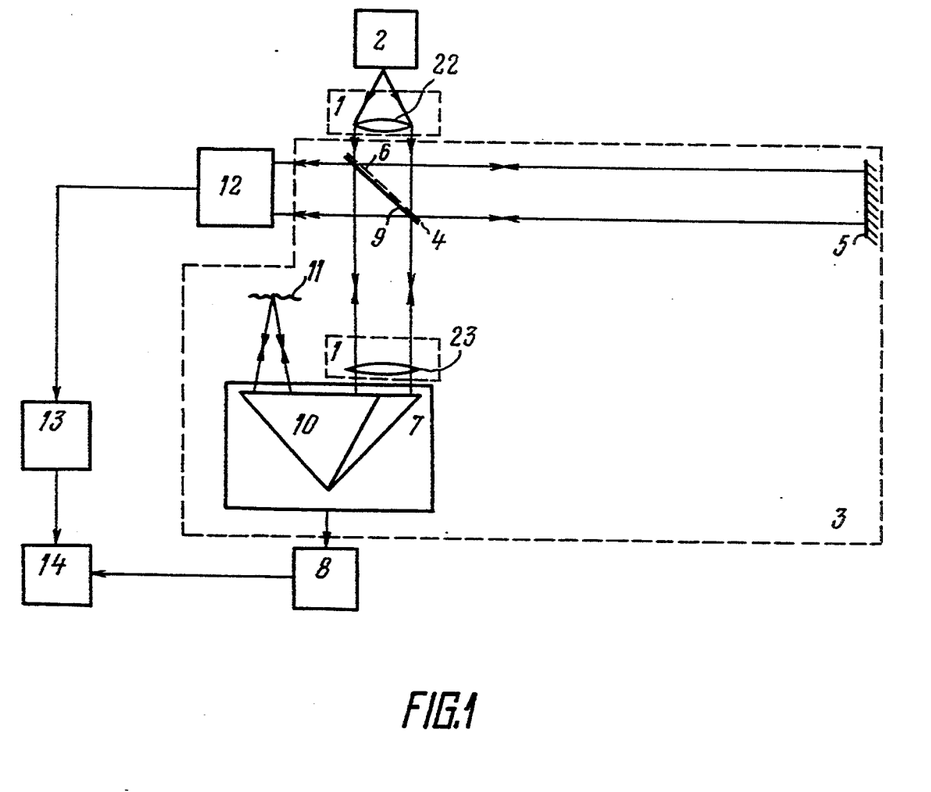
FIG. 1 is a schematic diagram of an apparatus for determining surface contour of diffusely reflecting objects according to one embodiment of the invention where the lens consists of two components.

The range of displacements of the optical path modulator 7 is selected on a condition of correspondence between positions of said modulator and the surface of an object 11. At the same time, variation of the optical path of the modulator 7 may not be less than two coherence lengths of the radiation source 2. This condition arises from the necessity of analyzing the function of contrast between the bands which is changing within this interval of difference between optical path lengths of interfering beams.

The dimensions of the corner reflector 10 of the optical path modulator 7 are defined by a condition of correspondence between its entrance aperture and the exit aperture of the beam splitter 4. The displacement, relative to the plane of the beam splitter 4, of the axis of symmetry of the corner reflector 10 results from that the object 11 being exterior to the exit aperture of the pupil of the beam splitter 4. Whenever the beam splitter 4 is made in the shape of a cube (that is observed as a rule), the displacement of the axis of symmetry of the corner reflector 10 of the modulator 7 as, well as, perpendicular to said displacement, the linear dimension of said reflector, may be equal to one side length of the cubic beam splitter 4, and the dimension perpendicular to said displacement may be equal to double side of the cubic beam splitter 4. The objective 1 is made with a possibility to integrate optically the radiation source 2 with the plane corresponding to the zero difference between path lengths of object and reference beams. At the output of the interferometer 3 a photodetector 12 is mounted, and its output is connected to the input of a device 13 serving to sense contrast in the interference bands. The output of the latter is connected to a device 14 which detects the position of the optical path modulator 7, and the device 14 is connected to the device 8 intended to measure displacements of the modulator 7.

The device 13 sensing contrast of the interference bands may be made as a known structure, for example, with connected in series: a detector (not shown), a differentiator (not shown), and a level limiter (not shown) (J. Marchais "L'amplificateur operationnel et ses applications" 1971, Masson et C.Editeurs (Paris)). The device 14 serving to detect position of the modulator 7 corresponds to the known configuration and contains three flip-flops (not shown), two of them having adjusting inputs. Outputs of the flip-flops fitted with adjusting inputs are connected via cells & of coincidence (not shown) to counters (not shown). A third flip-flop is connected by its synchronous input to the output of one of the flip-flops having adjusting inputs. The device 8 measuring displacement of the optical path modulator 7, in a general manner, contains a system 15 which measures initial position of the optical path modulator 7 (FIG. 2), and a system 16 which measures its relative displacement. The optical part of the system 15 measuring initial position of the modulator 7 is realizable in two forms illustrated by FIG. 2 and FIG. 3, whereas its electronic part, as a rule, contains a photodetector 17 and a device 18 sensing the contrast of the interference bands, which device may be made according to the same configuration as the device 13 which senses the contrast of the interference bands. The system 16 measuring relative displacement of the modulator 7 is made according to a known configuration and contains a light emitting diode 19, a photodetector 20, and two parallel plane rasters 21 mounted between them, one of said rasters being fixed to the modulator 7. The rasters 21 are oriented so that their planes are parallel and their lines perpendicular to the axis of symmetry of the corner reflector of the optical path modulator 7. The photodetector 20 by its output is connected to free inputs of the coincidence cells & (not shown) of the device 14 detecting position of the optical path modulator, the adjusting inputs R (to the "zero" state) of the first and of the second flip-flops (not shown) in said device 14 are connected to outputs of the devices 13 and 19 sensing contrast of interference bands, accordingly, and the adjusting inputs S (to the "one" state) of said flip-flops (not shown) are connected to outputs of the devices 19 and 13 sensing the contrast of the interference bands, accordingly.

Figure 2:
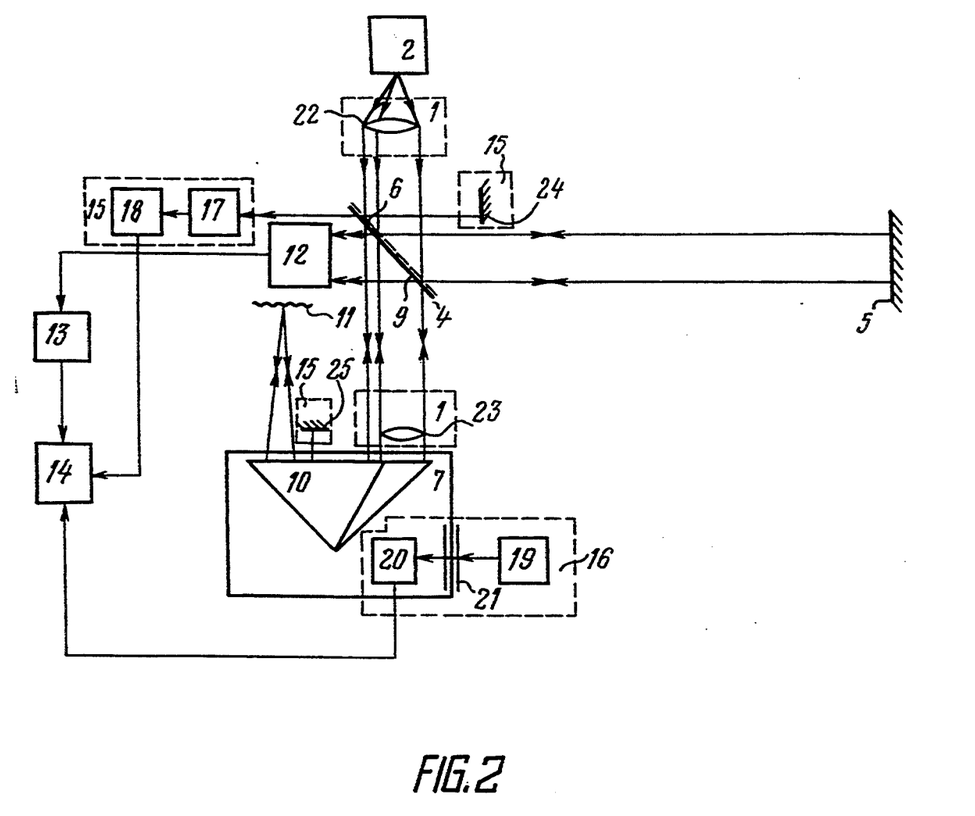
FIG. 2 is a diagram of the apparatus of FIG. 1 with devices measuring initial position of the modulator and a relative displacement of the modulator.
Figure 3:
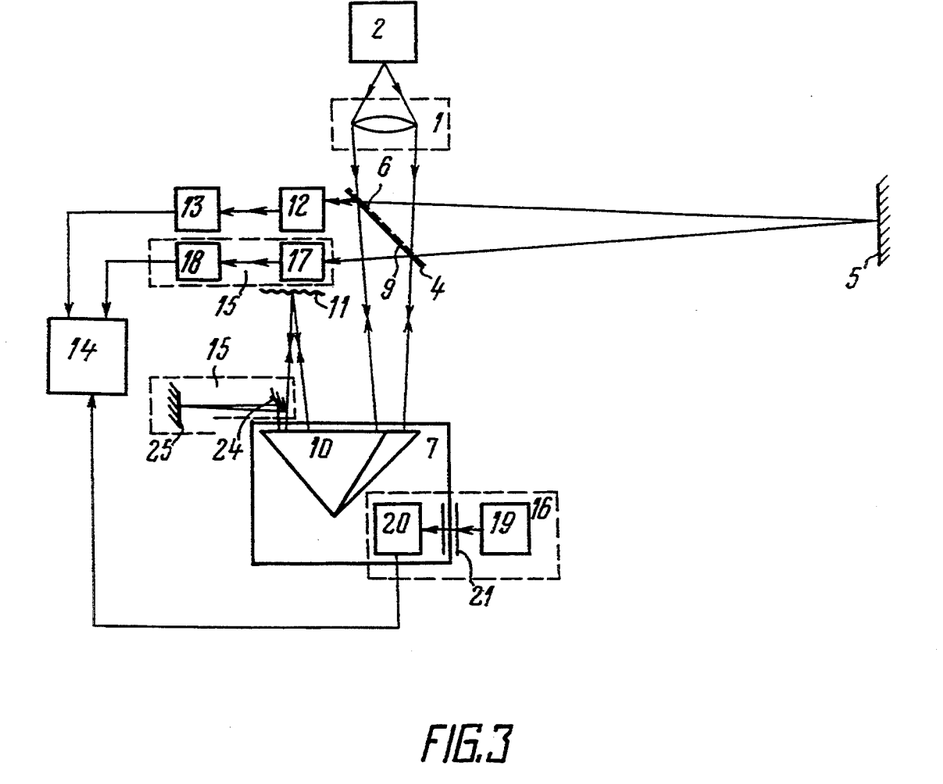
FIG. 3 is a diagram for determining surface contour of diffusely reflecting objects in accordance with the second embodiment.

FIG. 2 shows an embodiment of an apparatus for determining surface contour of diffusely reflecting objects in which the objective 1 contains two components 22 and 23. The first component 22 of the objective 1 is located after the coherent radiation source 2 at a distance from it equal to the focal length of said component, and the second component 23 of the lens 1 is situated between the beam splitter 4 and the optical path modulator 7 away from the beam splitter 4 by a distance equal to the difference between the distance from the beam splitter 4 to the reference mirror 5 and the focal length of the second component 23. The system 15 measuring initial position of the modulator 7, as it has been noted above, contains the optical part and the above-described electronic part. The optical part of the system 15 measuring initial position of the modulator 7 contains a first mirror 24 located between the beam splitter 4 and the reference mirror 5 parallel to the latter, and a second mirror 25 mounted on the beam path perpendicular to it in front of the reflecting surfaces of the corner reflector 10 of the modulator 7 and turned towards said surfaces. The second mirror 25 is displaced relative to the axis of symmetry of the corner reflector 10 in the direction opposite to the beam splitter 4. The first and the second mirrors 24 and 25, accordingly, are located away from the beam splitter 4 by distances corresponding to equal optical path lengths, whereas the centers of the mirrors 24 and 25 are shifted from the axis of symmetry of the beam splitter 4 in one and the same direction. Therewith, the position of the optical path modulator 7, in which the mirrors 24 and 25 are located away from the beam splitter 4 by distances corresponding to equal optical path lengths, is the initial position of said modulator. In order to provide the most effective use of light coming from the coherent radiation source 2, the axis of symmetry of the second component 23 of the objective 1 is displaced relative to the axis of symmetry of the beam splitter 4 in the direction opposite to the displacement of centers of the mirrors 24 and 25. The value of displacement of the axis of symmetry of the second component 23 of the objective 1 relative to the axis of symmetry of the beam splitter 4 is chosen upon a condition that approximately 20% of the beam irradiating the object 11 is deflected towards the system 15 intended to measure initial position of the modulator 7. The photodetector 17 of the system 15 measuring the initial position of the modulator 7 is mounted after the entrance window of the interferometer 3 on the optical axis of said system. The output of depicted photodetector 17 is connected to the input of the device 18 sensing contrast of interference bands in the system 15 which measures initial position of the optical path modulator 7. FIG. 3 shows a second embodiment of the apparatus for determining surface contour of diffusely reflecting objects, in which the objective 1 is mounted between the radiation source 2 and the beam splitter 4. Focal length of the objective 1 and the distance at which the objective 1 is mounted relative to the radiation source 2, are chosen using known methods of selecting the objective 1 on the condition of optical integration of the radiation source with the plane corresponding to the zero difference between the path lengths of the object and of the reference beams in the interferometer 3 (FIG. 1). In such an embodiment of the apparatus the system 15 (FIG. 3) which measures initial position of the modulator 7 contains an electronic part including, as in the first embodiment, a photodetector 17 mounted after the entrance window of the interferometer 3 (FIG. 1) on the optical axis of this system 15 (FIG. 3) and a device 18 which senses the contrast of the interference bands, the input of which is connected to the output of said photodetector 17. The optical part of the system 15 measuring the initial position of the modulator 7 also contains two mirrors 24 and 25. The first mirror 24 is located in front of the reflecting surfaces of the corner reflector 10 of the modulator 7, is turned towards said surfaces, shifted relative to the axis of symmetry of the corner reflector 10 in the direction opposite to the beam splitter 4, and oriented at an angle to the axis of symmetry of the corner reflector 10. The second mirror 25 is located after the first mirror on the beam path and mounted perpendicular to the beam path, said second mirror 5 being located array from the beam splitter 4 by distances corresponding to equal optical path lengths. The position of the modulator 7 corresponding to said arrangement, relative to the beam splitter 4, of the second and of the reference mirrors 25 and 5, accordingly, is the initial position of said modulator. In a general case, the displacement of the first mirror 24 relative to the axis of symmetry of the corner reflector 10 is selected by known methods based on the condition that approximately 20% of the beam illuminating the object 11 should be deflected towards the second mirror 25. Because of the fact that the second mirror 25 and the reference mirror 5 are located away from the beam splitter 4 by distances corresponding to the equal optical path lengths, if the object 11 is at large distances (approximately 1 meter), the place of location of the second mirror 25 will enlarge dimensions of the apparatus in comparison with the first embodiment of the apparatus, where positions of the mirrors 24 and 25 of the system 15 measuring initial position of the modulator 7 do not depend on the distance separating the object 11. Owing to the fact that the mirrors 24 and 25 of the system 15 measuring initial position of the modulator 7 (in both embodiments of the apparatus) are rigidly fixed on the base of the apparatus, calibration of the apparatus is not needed, and the measurement of positions of the modulator does not depend on eventual variations of parameters of the modulator 7, caused for example by variations of ambient temperature or by ageing of the membrane (not shown) of the modulator 7. In the first and in the second embodiments of the apparatus for determining surface contour of diffusely reflecting objects, the components 22 (FIG. 2) and 23 of the objective 1 (the first embodiment) and the lens 1 (FIG. 3) (in the second embodiment) may be realized as one lens as well as an array of lenses. The interval of displacements of the optical path modulator 7, specified for the apparatus for determining surface contour of diffusely reflecting objects, indicates the range, convenient for said apparatus, of positions of surface of the object 11. Before using the apparatus it is mounted relative to the object 11 in accordance with the specified range.

The apparatus for determining surface contour of diffusely reflecting objects operates as follows:

The beam of light emitted from the coherent radiation source 2 (FIG. 1) is collimated by the first component 22 of the lens 1 and divided by the beam splitter 4 in two beams, one of which is directed towards the reference mirror 5 thus forming the reference beam, and the second beam via the second component 23 of the objective 1 via the corner reflector 10 of the modulator 7 (after said beam is in succession reflected from the modulator surfaces) is directed to the object 11 and forms the object beam. Owing to that the second component 23 of the objective 1 is located away from the beam splitter 4 by a distance equal to the difference between the distance separating the beam splitter 4 from the reference mirror 5 and the focal length of the second component 23 of the objective 1, the beam illuminating the surface of the object 11 when it is passing through said component 23 of the objective 1 is focused onto a plane corresponding to the zero difference between the optical path lengths of the reference and of the object beams. The wave front of light, which has been modulated by the speckle structure and scattered by the diffuse object 11, passes in reverse direction through the optical path modulator 7, via the second component 23 of the objective 1, via the beam splitter 4 and through the exit window (not shown) of the interferometer 3 and falls on the photodetector 12. The beam reflected from the reference mirror 5 passes in reverse direction through the beam splitter 4 and is brought in coincidence with the object beam, passes also through the exit window (not shown) of the interferometer 3 and falls on the photodetector 12, where the reference and the object beams are interferometrically compared. In a general case the object parameters are evaluated by the value of variation of the optical path length of the reference or object beam from its initial value up to the moment when appears the interference pattern displaying maximum contrast. In the proposed design the optical path length of the object beam is varied by a shift of the corner reflector 10 of the modulator 7. Displacing the corner reflector 10 of the modulator 7 by an electromagnetic drive (not shown), the position of the plane corresponding to the zero path length difference between the reference and the object beams is varied within a specified range. At the moment of coincidence of said plane with the surface of the object 11, an interference pattern of maximum contrast appears on the entrance window of the photodetector 12. Owing to the fact that the focal plane of the second component 23 of the objective 1 coincides with the plane corresponding to the zero path length difference of the interferometer 5, the focus of the object beam and said plane corresponding to the zero path length difference are moving simultaneously. At the moment of coincidence of said plane, corresponding to the zero path length difference, with the surface of the object 11, the object beam will be focused onto the surface of the object 11 and the average size of elements in the speckle structure of the wavefront of light scattered by the diffuse object will have its maximum at the moment when the interference pattern with the maximum contrast is displayed. Therefore, the photodetector 12 in the proposed design may possess an aperture diaphragm having dimensions larger than in known designs as, for example, in U.S. Pat. No. A, 4,647,205. Therewith the quantity of light falling on the photodetector 12 will also be larger at any position of the object 11, thus allowing to increase the speed of motion of the optical path modulator 7 and thereby to reduce the time needed for the operation of determining surface contour of diffusely reflecting objects. The movement of the modulator 7 is realized before the decay of contrast of the interference pattern. At the moment when the interference pattern of the maximum contrast occurs, the device 13 which senses contrast of the interference bands sends a pulse to one of the inputs of the device 14 detecting the position of the optical path modulator 7. Moreover, during operation of the apparatus, other inputs of the device 14 detecting the position of the optical path modulator 7 permanently receive information about relative position of said modulator 7 in a system 16 measuring its relative movement (FIG. 2), as well as a pulse from a system 15 intended to measure the modulator initial position, which pulse corresponds to such a position of the modulator 7 with the corner reflector 10 in which the optical path lengths between the beam splitter 4 and the mirrors 24, 25 are equal. The position in time of the pulse coming from the system 15, measuring the initial position of the optical path modulator 7, corresponds to the contrasting interference pattern projected on the photodetector 17 of said system 15. When the optical path modulator is moving, at the same time one of the rasters 21 located on said modulator 7 moves in a direction perpendicular to the lines of the rasters 21. Then the output of the photodetector 20 will produce pulses with a time interval between them corresponding to the displacement of the raster 21 located on the modulator 7 by a distance equal to the raster period. Said information is permanently delivered to the input of the device 14.

The device 14 for detecting position of the optical path modulator 7 operates as follows. The sequence of arrival of pulses to the device 14 detecting position of the modulator 7 from the devices 13 and 18 which sense contrast of interference bands depends on the position of the surface of the object 11 relative to the plane corresponding to the zero path length difference between interfering beams when the optical path modulator 7 is located in its initial position. Before the beginning of the cycle of measurements the flip-flops (not shown) as well as counters (not shown) of the device 14 detecting position of the optical path modulator are set in their initial state. When the optical path modulator is moving from one extreme position to the other, pulses coming from the device 13 and 18, sensing contrast of interference bands, change twice the state of one of the first two flip-flop of the device 14 which detects position of the optical path modulator 7, while the state of the other flip-flop is changed only once. The third flip-flop (not shown) of said device 14 which is connected to the output of one of the first two flip-flops and which responds to the second changing-over of this flip-flop, defines in this way which of the flip-flops is changed-over twice or, in other words, it defines the sequence of arrival of pulses from the devices 13 and 18 which sense contrast of the interference bands. The flip-flop which has been changed over twice, by means of a cell of coincidence (not shown), connects a counter (not shown) to the system 16 which measures relative displacement of the optical path modulator 7. This counter, by registering the quantity of pulses coming from said system 16, determines the position of surface of the object 11 relative to the plane corresponding to the zero path length difference between interfering beams when the optical path modulator 7 is in its initial state. Here the fact of operation of the third flip-flop in the device 14 which detects position of the optical path modulator indicates which of said two counters contains information and also determines the sign of this information, that is the situation of the object surface relative to above-mentioned plane. So, during one cycle of measurement realized in one of the counters of the device 14 detecting position of the optical path modulator 7, information about the position of surface of the object relative to the zero path length difference between the interference beams is detected when the optical path modulator 7 is in its initial position. The device shown in FIG. 3 operates, basically, similar to the above-described device but, unlike the latter, the object beam in this device (FIG. 3) is focused onto the plane corresponding to the zero path length difference between the object and the reference beams by means of the objective 1 mounted after the coherent radiation source 2, therewith coincidence of the object beam focus with the object surface is provided during measurements, that is at the moment when interference pattern displays maximum contrast. Owing to the fact that in the proposed device the objective 1 is mounted after the coherent radiation source 2, the point source of light is projected onto the reference mirror 5 and the second mirror 25 of the system 15 intended to measure initial position, and subsequently, variation of angles at which these mirrors 5 and 25 are oriented does not influence on operation of the apparatus, that is such an apparatus is more resistant to disalignment than the apparatus according to the first embodiment which is shown in FIG. 2, in which apparatus all the mirrors 5, 24 and 25 receive parallel beam of light and which apparatus is preferable for use in the processes accompanied by vibrations, by elevated temperatures. Moreover, operation of the device of FIG. 3 is different to others by its method of determining of the initial position of the optical path modulator 7. In the apparatus here described the initial position of the optical path modulator 7 corresponds to the position in which the optical path lengths from the beam splitter 4 to the reference mirror 5 and to the second mirror 25 of the system 15 measuring the initial position of the modulator 7 are equal. The position of surface of the object 11 is evaluated relative to the position of the plane, corresponding to the zero path length difference between interfering beams when the optical path modulator 7 is in its initial position.

INDUSTRIAL APPLICABILITY

The proposed method and apparatus for determining surface contour diffusely reflecting objects may be used with the highest effect in mechanical engineering, for quick and precise contactless measurements of dimensions of workpieces.

I claim:

1. A method of determining a surface contour of a diffusely reflecting object comprising the steps of:
    splitting radiation emitted from a coherent light source at a beam splitter into a first beam and a second beam;
    directing said first beam towards a reference reflector situated at a first optical path length from the beam splitter to form a reference beam, and producing a first reflected beam from the reference reflector;
    directing said second beam towards an object being measured and situated at a second optical path length from the beam splitter to form an object beam, and producing a second reflected beam from a surface of the object;
    a sum of said first optical path length and said second optical path length defining a total optical path length;
    focusing said object beam onto a plane spaced from the beam splitter a distance equal to the first optical path length;
    interfering said first and second reflected beams at said beam splitter and producing an interference pattern from said interfering beams;
    determining a value of contrast of said interference pattern;
    varying said total optical path length by a value which is larger than two coherence lengths of the radiation coherence while maintaining the focus of the object beam in said plane;
    measuring the value of the variation of said total optical path length, and simultaneously determining any variation in the value of the contrast of said interference pattern; and
    determining the value of the variation of the total optical path length from a predetermined initial value when the contrast of said interference pattern attains its maximum value, the value of the variation corresponding to the surface contour of the diffusely reflecting object.

2. A method as claimed in claim 1, wherein the second optical path length is varied while the first optical path length remains fixed.

3. A method as claimed in claim 1 further including the step of focusing the reference beam into a spot on the reference reflector.

4. A method as claimed in claim 1, wherein the predetermined initial value of said total optical path length is established by the further steps of:
- directing a portion of each of the first and second beams to reflectors situated at positions which define equal optical path lengths from the beam splitter at the predetermined initial value of the total optical path length;
- interfering reflected beams from said reflectors at the beam splitter and producing an interference pattern from said interfering beams;
- determining a value of contrast of the interference pattern, said value varying as said total optical path length is varied; and
- generating a signal when the value of the contrast of the interference pattern attains a maximum value.

5. Apparatus for determining a surface contour of a diffusely reflecting object comprising:
- a source of coherent radiation;
- a double beam interferometer including a beam splitter placed in the path of the coherent radiation to split said radiation into a first beam directed towards a reference mirror to form a reference beam having a first optical path length, and a second beam directed towards a surface of an object being measured to form an object beam having a second optical path length, said beam splitter receiving reflected beams from the reference mirror and the object surface and re-combining them into a combined beam;
- a sum of said first optical path length and said second optical path length defining a total optical path length;
- a photodetector system including a photodetector mounted in the path of the combined beam for detecting an interference pattern in the combined beam;
- means for determining a value of the contrast of the interference pattern and for producing a signal when the contrast is at its maximum value;
- an objective which comprises at least one lens and which focuses at least the object beam to a point in a plane spaced from the beam splitter a distance equal to the first optical path length;
- an optical path modulator;
- means for causing displacements of the optical path modulator in order to vary the total optical path length by a value which is larger than two lengths of the radiation coherence while maintaining the beam focused in said plane; and
- means for determining the position of the optical path modulator relative to a predetermined initial position and for providing an output indicative of the position of the optical path modulator at the instant of maximum contrast in the interference pattern, the output corresponding to the surface contour of the diffusely reflecting object.

6. Apparatus as claimed in claim 5, wherein the objective comprises:
- a first lens disposed between the radiation source and the beam splitter at a distance from the radiation source equal to the focal length of the first lens; and
- a second lens situated between the beam splitter and the optical path modulator at a distance from the beam splitter equal to the difference between the first optical path length and the focal length of the second lens.

7. Apparatus as claimed in claim 5, wherein the objective comprises a single lens disposed between the radiation source and the beam splitter, and spaced from the radiation source at a distance such that the radiation passing through the lens is focused into a point on the reference mirror.

8. Apparatus as claimed in claim 5, wherein the means for determining the position of the optical path modulator comprises:
- means for determining an initial position of the optical path modulator and for producing a first signal when the optical path modulator is in said initial position;
- means for measuring an instantaneous position of the optical path modulator and for producing second signals providing a continuous indication of the value of said displacements; and
- means for receiving the signal from the photodetector system and said first and second signals and for producing said output.

9. Apparatus as claimed in claim 8, wherein the means for determining an initial position of the modulator comprises:
- a first reflector disposed in the path of the reference beam and which reflects a part of the reference beam back to the beam splitter;
- a second reflector disposed in the path of the object beam and which reflects a part of the object beam back to the beam splitter to be combined at the beam splitter with the reflected part of the reference beam to produce a combined beam;
- a further photodetector for detecting an interference pattern in the combined beam; and
- further means for determining a value of contrast of the interference pattern and for producing said first signal when the contrast is at its maximum value.

10. Apparatus according to claim 5, wherein the optical path modulator comprises:
- a corner cube retroreflector mounted in the path of the object beam; and
- means for causing oscillating movements of the corner cube retroreflector.

* * * * *